Patented May 23, 1944

2,349,275

UNITED STATES PATENT OFFICE 2,349,275

SEPARATION OF TOCOPHEROL FROM SCUM WITH SOLVENTS

Kenneth C. D. Hickman, Rochester, N. Y., assignor to Distillation Products, Inc., Rochester, N. Y., a corporation of Delaware No Drawing. Application November 25, 1941, Serial No. 420,366

6 Claims. (Cl. 260—333)

This invention relates to an improved procedure for preparing tocopherol concentrates and in particular to an economical process for the preparation of tocopherol in relatively concentrated form.

Tocopherol has been known to exist for a number of years and is known to have therapeutic properties. However, the material has been exceedingly expensive until the advent of my invention. Until recently the only source of tocopherol was vegetable oils such as wheat germ oils. These oils contain the tocopherol in minute amounts being substantially less than $\frac{1}{10}$ per cent in concentration. Concentrates of such oils have been prepared by saponification of the oils, but the saponification procedure as heretofore carried out resulted in considerable destruction of the tocopherol thus adding substantially to the final cost of the concentrate. Recently tocopherol has been synthesized but the starting materials are expensive and the yields are poor.

This invention has for its object to provide a cheap source of tocopherol. A further object is to provide improved procedure for the preparation of tocopherol. Other objects will appear hereinafter.

These and other objects are accomplished by my invention which includes treating scum derived from vacuum-carrier gas deodorization treatment of a vegetable or animal oil which contains tocopherol with a solvent in which the tocopherol is at least partially soluble and in which at least part of the constituents of the scum are insoluble under the conditions of treatment.

In the following description and claims I have set forth several of the preferred embodiments of my invention, but it is to be understood that these are given for the purpose of illustration and not in limitation thereof.

The scum which is utilized in my invention is a substance which has heretofore been a waste by-product of the vegetable and animal oil (i. e. glyceride oil) industry and particularly the deodorization industry. This material is a complex mixture of organic compounds volatilized from the oil during deodorization and like procedures. The most common method of deodorizing vegetable and animal oils is to pass steam therethrough under reduced pressure. The steam after passing through the oil is usually condensed in a barometric condenser and the condensed steam is then permitted to flow into a sump, catch basin, or condenser discharge. The scum separates on the surface of the water in the sump or condenser and may be skimmed off. It has heretofore been the usual practice to permit it to flow into the sewer. The scum also collects on the walls of the apparatus and may be removed therefrom. Such materials are known in the deodorization art as "deodorizer hotwell sludge," "catch basin scum," "catch-all sludge," etc. It is also somewhat common procedure in the deodorizing field to place a trap between the deodorizer and the condenser, in which case the scum or its substantial equivalent is partially or completely condensed in the trap instead of entirely passing into the barometric catch basin or sump. Such material is known as in the deodorizing art as "trap sludge." It is to be understood that the word scum as used herein and in the claims shall include all such matters in crude or partially refined condition produced by the methods mentioned or by any equivalent method involving the separation of the organic material volatilized during the carrier gas, vacuum treatment of vegetable and animal oils which contain tocopherol.

Useful scum can only be obtained from the foregoing procedures when applied to oils which contain tocopherol. Most of the vegetable and animal oils in their fresh and natural condition contain this material, but the vegetable oils are usually considerably richer sources and I prefer to utilize scum produced from them. Examples of particularly rich oils are corn, cottonseed and soybean. Fresh oils are preferred as a source of the scum and particularly oils which have been subjected to no treatment which would have a harmful effect upon the tocopherol. Ordinarily alkali refining is undesirable since it decreases the tocopherol content, but oils which have been alkali refined can serve as a source, although a poor one.

The scum as ordinarily obtained from the deodorizer contains about 5 to 20 per cent water which is emulsified with the organic constituents present. I prefer first to remove the water content of the scum which may be accomplished by any desired dehydrating procedure such as distillation, dehydrating agents, and the like. I prefer to remove the water by heating the mixture to the melting point so that the scum separates as an upper oil layer. The layer can then be decanted or withdrawn and treated with solvents as described. It may also be advantageous to pretreat the scum in order to effect a preliminary concentration. Thus the scum may be preliminarily vacuum distilled to separate constituents having little or no tocopherol content and to leave a residue having an increased tocopherol content. Alternatively the distillation may be continued to secure a fraction having a relatively high content of tocopherol. In either case, the tocopherol-containing residue or fraction is then subjected to solvent treatment in accordance with my invention. It is to be understood that while such pretreatment may be advantageous in some cases, my invention includes the treatment of scum in its crude state.

The scum may be dissolved in a solvent of the type indicated and the mixture then cooled to precipitate inert matter such as free fatty acids and sterols. The liquid filtrate containing the tocopherol is then treated to remove solvents such as by vacuum distillation. The residue will then be found to have a tocopherol content substantially higher than that of the starting material. By an alternative procedure the scum may be extracted with a solvent either in batch or continuous countercurrent processes.

*Example 1.*—A 6.83 gram sample of untreated scum having a content of 1.3 per cent tocopherol was dissolved in 100 cc. of petroleum ether and the solution extracted with five 100-cc. portions of 95 per cent methyl alcohol. The following table indicates the results:

| | Per cent tocopherol |
|---|---|
| 1 | 3.88 |
| 2 | 4.88 |
| 3 | 5.06 |
| 4 | 5.27 |
| 5 | 5.12 |

*Example 2.*—Twenty-three grams of dehydrated scum having a tocopherol content of 1.3 per cent were dissolved in 100 cc. of petroleum ether. The solution was then extracted with five 100-cc. portions of 83 per cent ethyl alcohol. The tocopherol content of the extract is indicated in the following table:

| | Per cent tocopherol |
|---|---|
| 1 | 1.46 |
| 2 | 1.73 |
| 3 | 2.27 |
| 4 | 3. |
| 5 | 3.68 |

This represented a rather low concentration but could have been improved by utilization of lower temperatures. The concentration in the last three extracts was two to three times that of the original.

*Example 3.*—Crude scum containing about 4 per cent tocopherol was put into a large tank and heated to the melting point and kept warm until the water had settled. The oil layer was skimmed off the top, was degassed and then caused to flow through three centrifugal high vacuum unobstructed path stills connected in series. In the first still a fraction was removed at about 110° C. and a pressure of about .1 mm. This fraction represented a major amount of free fatty acid content of the scum and was discarded. The residue from the fatty still was introduced into the second still at a temperature of 130° C. and a pressure of about .05 mm. The distillate obtained in this still was relatively dilute, as far as tocopherol was concerned, and was recycled to the ingoing material to the first still. The residue from the second still was introduced into the third still which was at a temperature of about 180° C. and a pressure of about .01 mm. The distillate obtained in this still had a relatively high content of tocopherol. It was redistilled in a similar fourth still at a temperature of 160° C. and a pressure of .01 mm. The distillate was then dissolved in one part ethyl alcohol and one part acetone for each two parts of distillate. The mixture was then cooled to −10° to −35° to precipitate impurities. The mixture was filtered and the solvents were distilled from the filtrate to leave a residue having a tocopherol content of about 65 per cent.

*Example 4.*—Scum as removed from the deodorizer was heated on the steam bath to separate the layer of oil. The decanted oil was centrifuged to dryness. The dried oil contained 1.65 tocopherol. A 6.7 gram sample of dried oil was extracted with four 10-cc. portions of ethyl alcohol and an 8.65 gram sample of the oil was extracted with four 10-cc. portions of methyl alcohol. On the fifth extraction 20 cc. of ethyl alcohol and 20 cc. of methyl alcohol was used instead of 10 cc. The extraction was accomplished by mixing with a mechanical mixer, separation of the solvent layer and the extracts, were dried, weighed and assayed. The following table indicates the results:

| Ethyl alcohol: | Per cent tocopherol |
|---|---|
| 1 | 3.14 |
| 2 | 2.85 |
| 3 | 2.88 |
| 4 | 2.63 |
| 5 | 2.03 |
| Methyl alcohol: | Per cent tocopherol |
| 1 | 3. |
| 2 | 3.69 |
| 3 | 5.92 |
| 4 | 6.16 |
| 5 | 6.67 |

*Example 5.*—Crude scum was removed from the deodorizer, and heated with 10 per cent zinc dust and excess hydrochloric acid to reduce any oxidized material. Four hundred sixty grams of reduced scum were mixed with methyl acetate to form a 10 per cent solution. This solution was cooled to −42° C. to remove sterols and fatty acids. The filtrate was distilled under vacuum to remove the solvent. The following indicates the results:

| | |
|---|---|
| Per cent tocopherol in starting material | 4 |
| Grams of starting material | 460 |
| Grams remaining in residue | 175 |
| Per cent tocopherol in residue | 8 |

Instead of methyl acetate, acetone, petroleum ether, ethyl acetate, propylene oxide and the like may be employed in this procedure. Sterols are precipitated at about 0° or slightly lower depending upon the solvent employed. Fatty acids are precipitated at about −40° C.; below −40° C. stearin is precipitated. However, since the stearin has about the same tocopherol potency as the solvent solution, it is usually advantageous to leave it in the solvent solution.

*Example 6.*—A crude fraction of scum containing 14.3 per cent tocopherol and having an acid value of 76.4 was prepared by distillation as described in Example 3. This was dissolved in acetone to form a 10% solution. The mixture was cooled with stirring to −65° C. and filtered on a Buchner at the same temperature. The filtrate after removal of acetone had an acid value of 75.8 and a tocopherol content of 28.9 per cent.

Reference is made to my copending application 321,913, filed March 2, 1940, which relates to the purification of tocopherol contained in deodorizer scum.

What I claim is:

1. The process of concentrating the tocopherol contained in lighter-than-water scum derived from the steam utilized for the vacuum-steam deodorization of vegetable or animal oils which contain tocopherol, which comprises directly dissolving the unmodified scum in a solvent in which tocopherol is soluble but in which the constituents of the scum are at least partially insoluble at a lower temperature and then cooling the solution to a temperature at which the constituents of the scum are precipitated.

2. The process of concentrating the tocopherol contained in lighter-than-water scum derived from the steam utilized for the vacuum-steam deodorization treatment of a vegetable or animal oil which contains tocopherol, which process comprises directly dissolving the unmodified scum in methyl acetate cooling the solution of scum and methyl acetate to a low temperature at which non-tocopherol constituents of the scum are precipitated and then separating the precipitate from the solution.

3. The process of concentrating the tocopherol contained in lighter-than-water scum derived from the steam utilized for the vacuum-steam deodorization treatment of a vegetable or animal oil which contains tocopherol, which comprises directly extracting the unmodified scum with a solvent in which the tocopherol is soluble but in which the scum is at least partially insoluble.

4. The process of concentrating the tocopherol contained in lighter-than-water scum derived from the steam utilized for the vacuum-steam deodorization treatment of a vegetable or animal oil which contains tocopherol, which process comprises directly extracting the unmodified scum with a lower aliphatic alcohol and recovering the tocopherol from the alcohol extract.

5. The process of concentrating the tocopherol contained in lighter-than-water scum derived from the steam utilized for the vacuum-steam deodorization treatment of a vegetable or animal oil which contains tocopherol, which process comprises directly extracting the unmodified scum with a solvent selected from the group consisting of methyl and ethyl alcohol separating the alcohol and extracted matter and treating the alcoholic extract to separate the tocopherol therefrom.

6. The process of concentrating the tocopherol contained in lighter-than-water scum derived from the steam utilized for the vacuum-steam deodorization of a vegetable or animal oil which contains tocopherol, which comprises directly dissolving the unmodified scum in petroleum ether and then extracting the petroleum ether solution with a solvent for tocopherol which is substantially immiscible in said solution.

KENNETH C. D. HICKMAN.